United States Patent
Jayaram et al.

(10) Patent No.: US 9,863,215 B2
(45) Date of Patent: Jan. 9, 2018

(54) SHEAR VALVE SYSTEM AND METHODOLOGY

(71) Applicant: Schlumberger Technology Corporation, Sugar Land, TX (US)

(72) Inventors: Murali Jayaram, Pearland, TX (US); Michael Krail, Friendswood, TX (US); Anthony Veneruso, Sugar Land, TX (US); Ives Daniel Loretz, Houston, TX (US); Michael H. Du, Manvel, TX (US); Francesco Vaghi, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 65 days.

(21) Appl. No.: 14/780,970

(22) PCT Filed: Jan. 7, 2014

(86) PCT No.: PCT/US2014/010402
§ 371 (c)(1),
(2) Date: Sep. 28, 2015

(87) PCT Pub. No.: WO2014/158296
PCT Pub. Date: Oct. 2, 2014

(65) Prior Publication Data
US 2016/0053578 A1    Feb. 25, 2016

Related U.S. Application Data

(60) Provisional application No. 61/806,492, filed on Mar. 29, 2013, provisional application No. 61/806,488, (Continued)

(51) Int. Cl.
*E21B 34/06* (2006.01)
*E21B 34/10* (2006.01)
(Continued)

(52) U.S. Cl.
CPC .............. *E21B 34/14* (2013.01); *E21B 34/06* (2013.01); *E21B 34/10* (2013.01); *F16K 3/10* (2013.01);
(Continued)

(58) Field of Classification Search
CPC .......... E21B 34/06; E21B 34/10; E21B 34/14; F16K 3/10; F16K 3/18; F16K 11/0655; F16K 11/074; F16K 11/085
See application file for complete search history.

(56) References Cited

U.S. PATENT DOCUMENTS 3,329,168 A * 7/1967 Vollmer ................. F15B 13/04
                                                 137/625.65
3,601,149 A * 8/1971 Gilmore ................. F16K 17/04
                                                 137/484
(Continued)

FOREIGN PATENT DOCUMENTS

GB        2277573 A * 11/1994 ............. F16K 3/085

*Primary Examiner* — Matthew R Buck

(57) ABSTRACT

A technique facilitates control of fluid flows in a wide variety of applications and environments, including downhole well environments. The technique utilizes a valve system which may include a shear seal valve for controlling fluid flows. The valve system utilizes port arrangements, components for energizing shear seals between mating components, and/or actuating components with improved degrees of freedom. The components facilitate repeatable and consistent actuation and operation of the valve system in the wide variety of applications and environments.

13 Claims, 15 Drawing Sheets

Related U.S. Application Data filed on Mar. 29, 2013, provisional application No. 61/846,789, filed on Jul. 16, 2013.

(51) Int. Cl.
*E21B 34/14* (2006.01)
*F16K 3/10* (2006.01)
*F16K 3/18* (2006.01)
*F16K 11/065* (2006.01)
*F16K 11/074* (2006.01)
*F16K 11/085* (2006.01)

(52) U.S. Cl.
CPC ............ *F16K 3/18* (2013.01); *F16K 11/0655* (2013.01); *F16K 11/074* (2013.01); *F16K 11/085* (2013.01)

(56) References Cited

U.S. PATENT DOCUMENTS

| | | | | |
|---|---|---|---|---|
| 3,917,220 A * | 11/1975 | Gilmore | ................ | E21B 33/064 137/116.3 |
| 4,187,883 A * | 2/1980 | Webster | ............. | E21B 33/0355 137/625.11 |
| 4,444,216 A * | 4/1984 | Loup | .................... | F16K 11/0655 137/115.15 |
| 4,475,568 A * | 10/1984 | Loup | .................... | F16K 11/0655 137/115.15 |
| 4,493,335 A * | 1/1985 | Watson | ............... | F16K 11/0655 137/116.3 |
| 4,793,591 A * | 12/1988 | Decker | ............... | F16K 11/0655 137/625.18 |
| 4,856,557 A * | 8/1989 | Watson | ................. | F16K 3/0209 137/625.25 |
| 5,785,074 A * | 7/1998 | Kieper | .................. | F16K 5/0605 137/312 |
| 6,247,536 B1 * | 6/2001 | Leismer | ................ | E21B 34/066 166/305.1 |
| 6,651,696 B2 * | 11/2003 | Hope | ................... | F16K 17/046 137/469 |
| 7,000,890 B2 * | 2/2006 | Bell | ....................... | E21B 34/04 251/129.15 |
| 7,520,297 B2 * | 4/2009 | Bell | ....................... | G05D 16/10 137/505 |
| 7,757,703 B2 * | 7/2010 | Bell | ....................... | G05D 16/10 137/116.3 |
| 8,438,910 B2 * | 5/2013 | Berndt | .................. | F16K 11/074 73/61.56 |
| 9,121,244 B2 * | 9/2015 | Loretz | .................... | E21B 34/06 |

\* cited by examiner

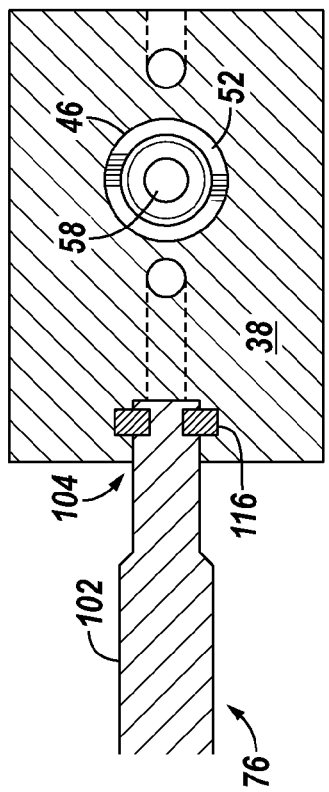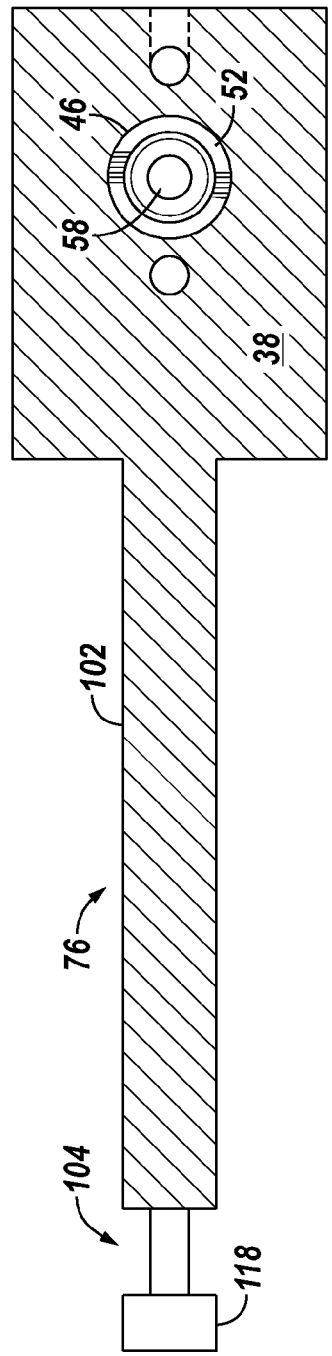

SHEAR VALVE SYSTEM AND METHODOLOGY

BACKGROUND

Shear seal type valves are used in a wide variety of applications. In well applications, shear seal valves may be used for switching high-pressure hydraulic fluids or dirty fluids. A shear seal valve contains a pair of shear seal structures that engage with mating outer seal plates to control flow of fluid between a supply port and one or more output, regulated, or vent ports. Shear seal valves tend to have many static and dynamic seals and sealing surfaces which can be difficult to axially align during manufacture and to maintain in desired geometric positions throughout their operational life. Additionally, higher friction loads and inconsistent shifting of the valve sometimes occurs due to a relatively high number of shear seal surfaces and variabilities in geometric and manufacturing tolerances as well as variations in downhole conditions.

SUMMARY

In general, a system and methodology are provided for a valve system, which may include a shear seal valve for controlling fluid flows. The valve system utilizes port arrangements, components for energizing shear seals between mating components, and/or actuating components with improved degrees of freedom. The components facilitate actuation and operation of the valve system in a wider variety of applications and environments.

However, many modifications and additional embodiments are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 20 is a cross-sectional illustration of another example of a driving mechanism of a shear seal type valve, according to an embodiment of the disclosure;

FIG. 21 is a schematic illustration of another example of a driving mechanism of a shear seal type valve, according to an embodiment of the disclosure;

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for controlling fluid flows via a valve system, including controlling fluid flows via selective porting or switching of fluid between ports. The valve system may include a shear seal valve for controlling the fluid flows, e.g. actuating fluid flows used downhole in a well application. The valve system utilizes port arrangements, components for energizing shear seals between mating components, and/or actuating components with improved degrees of freedom. The valve system may be used to facilitate actuation and operation of tools in a wide variety of applications and environments.

In embodiments of the valve system, a unique approach may be provided for exerting high force under downhole conditions within a small geometry so as to enable better energization of shear seal plates against their mating counterparts in a shear seal type valve. Embodiments also may comprise a unique driving mechanism, e.g. a drive shaft, with integral carrier and seal cylinders having shear seal contacts. The shear seal contacts are able to decouple rotation of the carrier with either movement or position of the driving mechanism while maintaining alignment of sealing surfaces under extreme conditions, e.g. downhole conditions, within a small geometry. Embodiments also may comprise unique ways for shifting of a shear seal valve in small, confined environments, such as the constrained space of downhole tools.

Various embodiments provide constructions for energizing shear seal plates against their mating counterparts while reducing the number of sealing surfaces. In some applications, supply and regulated ports may be positioned in non-axial or angular arrangements which are not on the same axis. Such embodiments may be used in a variety of environments and applications for switching high-pressure hydraulic fluids or dirty fluids. The embodiments also may be employed in spool valve applications or applications with alignment joints transferring one degree of freedom.

Figure 1:
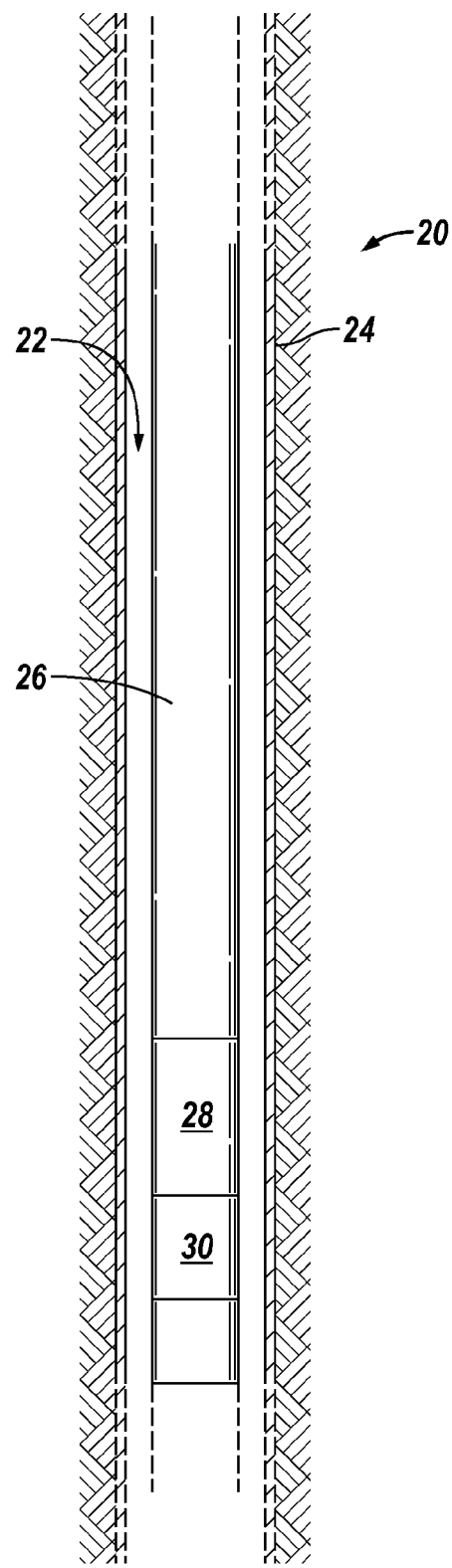
FIG. 1 is a schematic illustration of a valve system positioned along a well string deployed in a wellbore, according to an embodiment of the disclosure.

Referring generally to FIG. 1, an embodiment of a system 20, e.g. a well system, is illustrated as deployed in a wellbore 22. By way of example, wellbore 22 may be an open wellbore or a cased wellbore having a casing 24. The well system 20 comprises a well string 26 having a well tool 28 which cooperates with a valve system 30, such as a valve system 30 comprising a shear seal type valve.

Figure 2:
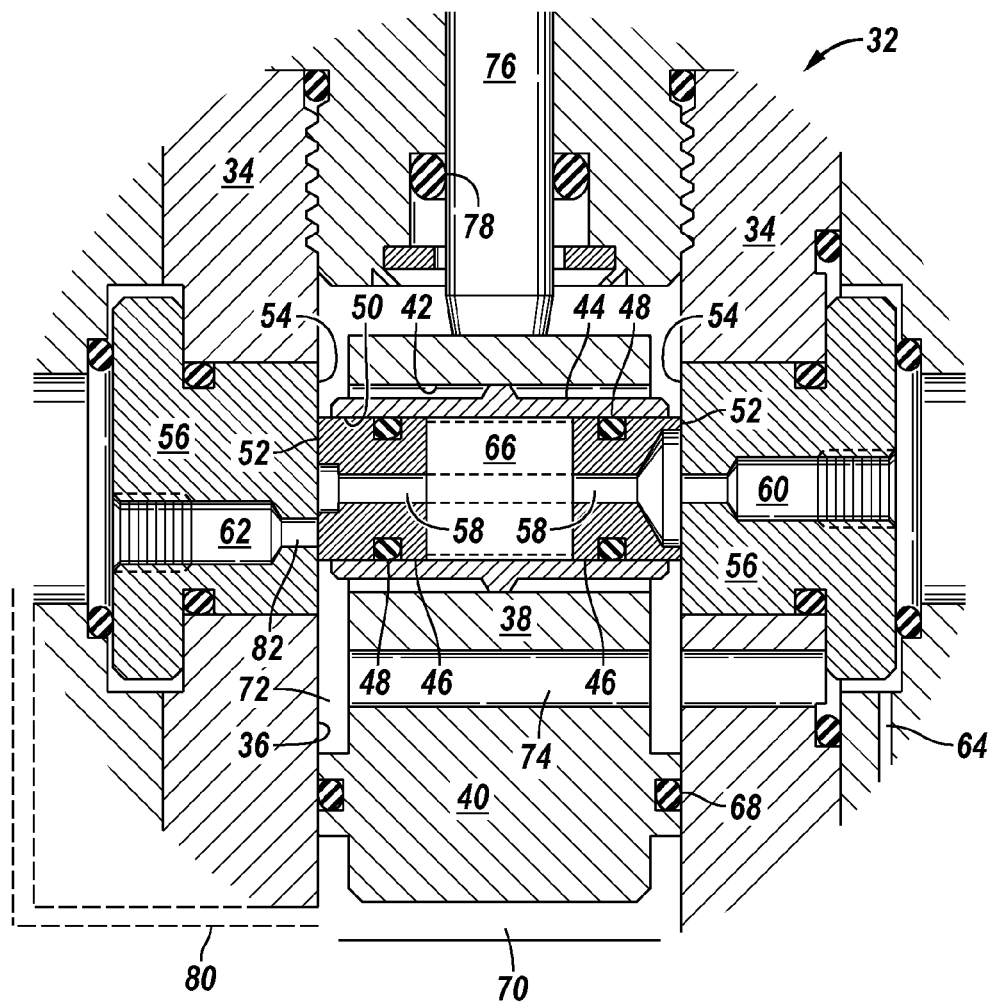
FIG. 2 is a cross-sectional illustration showing an example of a shear seal type valve of the belt system illustrated in FIG. 1, according to an embodiment of the disclosure.
Figure 3:
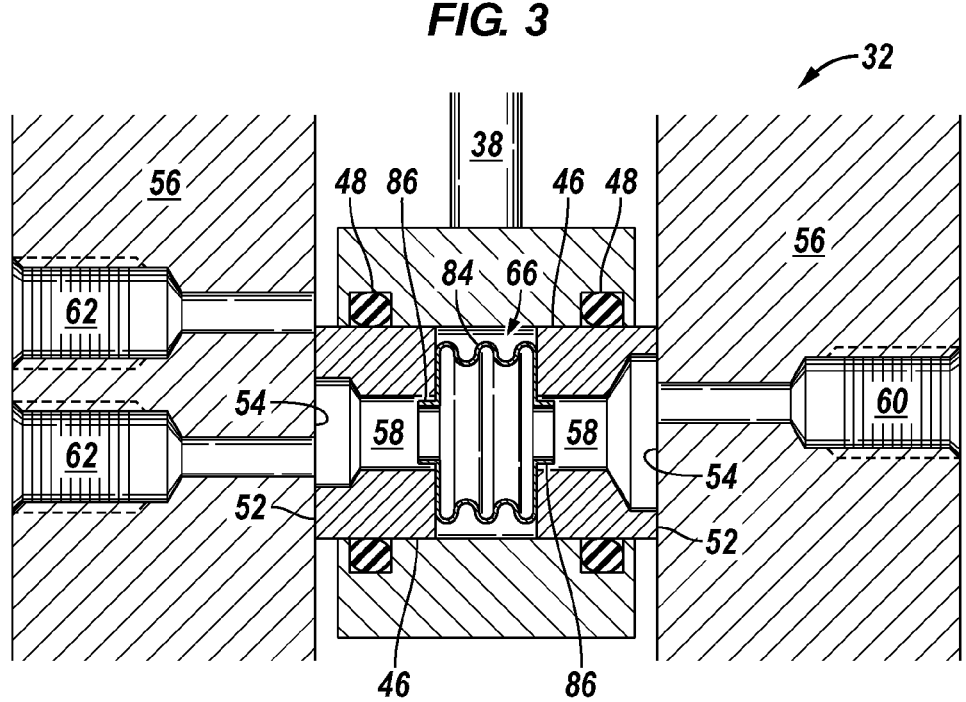
FIG. 3 is a cross-sectional illustration of an example of a portion of a valve having a shear seal biasing mechanism, according to an embodiment of the disclosure.

In FIG. 2, an embodiment of a shear seal type valve 32 is illustrated to provide an example of a type of valve that may be used in valve system 30. In this example, valve 32 comprises a valve body 34 having a cylindrical interior/bore 36 which slidably receives a carrier 38, e.g. a generally cylindrical carrier, coupled with a piston 40. The carrier 38 may comprise a generally transverse passage 42 which receives a flow tube 44, however some embodiments may be constructed without flow tube 44. Within flow tube 44, a pair of seal cylinders 46 is slidably and sealingly received via corresponding seals 48, e.g. O-ring seals, disposed for sliding engagement with an interior surface 50 of flow tube 44. Each seal cylinder 46 also comprises an outer end formed as a shear seal contact surface 52 oriented for sliding contact with a corresponding seal surface 54 of a seal component 56, e.g. a seal plate, mounted in valve body 34. In this example, seal component 56 and its seal surface 54 are a stationary part; and the seal cylinders 46 with their seal contact surface 52 are a dynamic part of the valve 32. It should be noted that valve body 34 may be formed as a single part or a plurality of parts combined to create cylindrical bore 36 and/or other features of valve 32. Similarly, other components may be formed as a single, unitary parts or combinations of parts. The various parts may be joined and sealed via suitable seals, e.g. O-ring seals, as illustrated Each seal cylinder 46 further comprises an internal flow passage 58 which may be selectively moved into an out of fluid communication with corresponding fluid supply port(s) 60, regulated port(s) 62, or vent port(s) 64. In this example, the supply port(s) 60 and regulated port(s) are disposed through shear components 56 on opposite sides of carrier 38. Additionally, a biasing mechanism 66, e.g. a non-helical spring member, is positioned between the seal cylinders 46 to bias the seal cylinders 46 away from each other such that shear seal contact surfaces 52 are biased against corresponding seal surfaces 54.

In the example illustrated, piston 40 is coupled with carrier 38 for slidable movement along cylindrical bore 36 of valve body 34. A seal 68, such as an O-ring seal, is positioned between piston 40 and the surrounding wall forming cylindrical bore 36, thus forming chambers 70 and 72 along cylindrical bore 36 on opposite sides of seal 68. In the illustrated embodiment, piston 40 also comprises a vent passage 74.

A driving mechanism 76, e.g. a drive shaft, also is coupled to carrier 38 on an opposite side of the carrier relative to piston 40. The driving mechanism 76 slidably extends into cylindrical bore 36 through a portion of the valve body 34 and may be sealed with respect to the valve body 34 via a seal 78, e.g. an O-ring seal. In a variety of embodiments, the driving mechanism 76 may be spring biased in a desired direction to bias carrier 38 toward a desired operational position with respect to ports 60, 62, 64. In other embodiments, the driving mechanism 76 is constructed so that carrier 38 is able to assume a plurality of stable, operational positions such that the carrier 38 remains in such stable, operational positions after pressure has been bled from the ports. It should be noted that the various components of valve 32 may be constructed in several different sizes, shapes and/or configurations depending on the specific environment and application in which valve 32 is operated.

In operation, when pressure at regulated port 62 is decreased, pressure in a chamber 70 also decreases due to passage 80 which couples regulated port 62 with chamber 70. When the pressure drops, the spring bias acting on driving mechanism 76 moves carrier 38 toward chamber 70 until flow passages 58 communicate with a passage 82 extending to regulated port 62. In this position, fluid can flow from supply port 60 to regulated port 62.

However, when the pressure acting on regulated port 62 is raised to a sufficiently high pressure, the pressure in chamber 70 causes piston 40 to move and overcome the spring bias acting on driving mechanism 76. This causes the carrier 38 to move in an opposite direction which closes off passage 82 partially or fully. If passage 35 is fully closed, as illustrated in FIG. 2, the pressure at regulated port 62 can be raised until fluid communication is established between regulated port 62 and vent port 64 via vent passage 74. Once the pressure at regulated port 62 drops again, the spring bias acting on driving mechanism 76 moves carrier 38 back toward a neutral position closing off passage 82. The passage 82 is partially or fully closed so as to maintain a desired pressure at the regulated port 62. In this manner, the carrier 38 may be shifted to different actuation positions for controlling fluid flow between a variety of ports, e.g supply port(s) 60, regulated port(s) 62, and/or vent port(s) 64.

Referring generally to FIGS. 3-13, several embodiments are illustrated of biasing mechanism 66 disposed between seal cylinders 46. The embodiments of biasing mechanism 66 are designed to overcome certain challenges associated with helical springs when used in miniaturized geometries and other spatial and/or environmentally constrained applications. In the embodiment illustrated in FIG. 3, for example, the biasing mechanism 66 comprises a metallic bellows 84 formed from a metallic material able to withstand high pressure and temperature environments, such as downhole environments. The metallic bellows 84 may be provided with inserts 86 which are removably received in the flow passages 58 of seal cylinders 46 so as to centralize and self-align the seal cylinders 46. The metallic bellows 84 is sufficiently resilient to bias the seal cylinders 46 outwardly and to force the shear seal contacts 52 against their corresponding seal surfaces 54 of seal plates 56 with sufficient loading. The bellows 84 also may be perforated with, for example, small holes which reduce the potential for rupture failure of the bellows. In at least some embodiments, pressure is not retained across the bellows wall.

Figure 4:
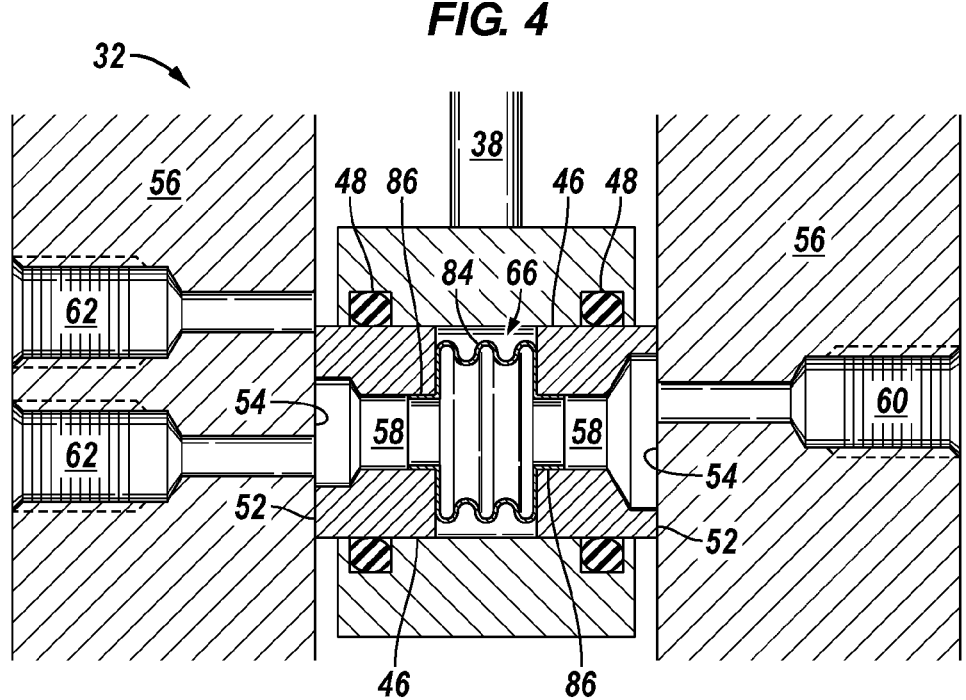
FIG. 4 is a cross-sectional illustration of another example of a portion of a shear seal type valve, according to an embodiment of the disclosure.

Referring generally to FIG. 4, another example of biasing mechanism 66 is illustrated. In this example, biasing mechanism 66 again comprises bellows 84, e.g. a metallic bellows, but the bellows 84 is integrated with the seal cylinders 46 which may be, for example, metallic or ceramic. The integration may be achieved by forming bellows 84 with inserts 86 which may be sized to be press-fit into or welded in corresponding passages 58 of seal cylinders 46. This type of embodiment enables a simpler assembly and reduces tolerance stack up with respect to the spacing between the two seal faces (surfaces 52 and 54).

Figure 5:
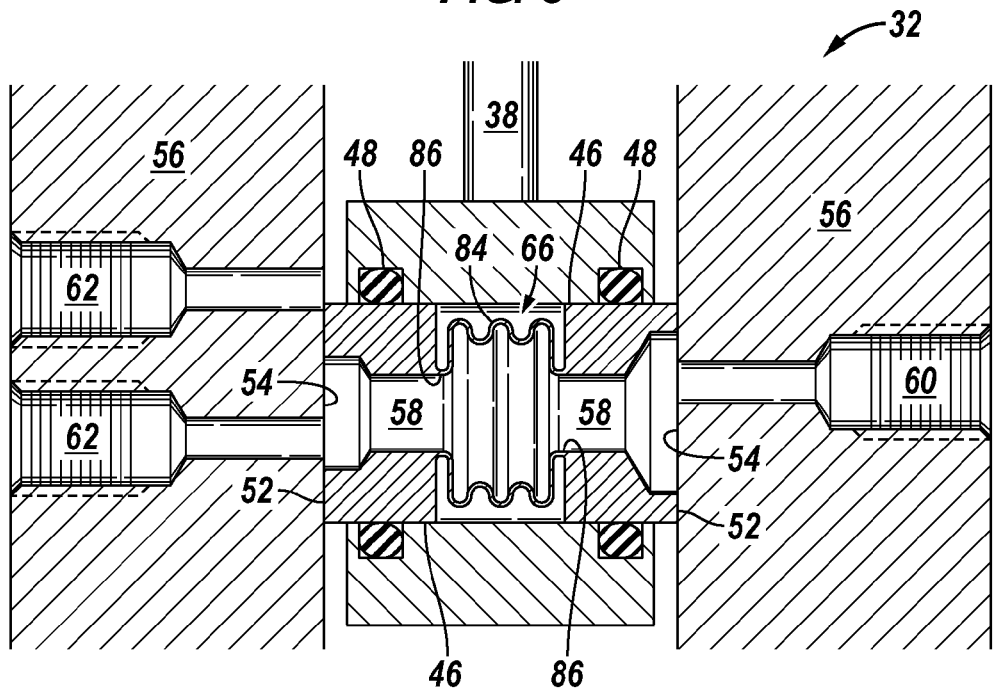
FIG. 5 is a cross-sectional illustration of another example of a portion of a shear seal type valve, according to an embodiment of the disclosure.

Another embodiment is illustrated in FIG. 5 in which the biasing mechanism 66 comprises a metallic flexible coupling 88. The metallic flexible coupling may be formed with an integrated bellows 84 and flanges which serve as the seal cylinders 46. In this example, the bellows 84 and flanges/seal cylinders are integrated and formed as a single peace. This again enables simpler assembly and reduces tolerance stack up with respect to spacing between the seal faces.

Figure 6:
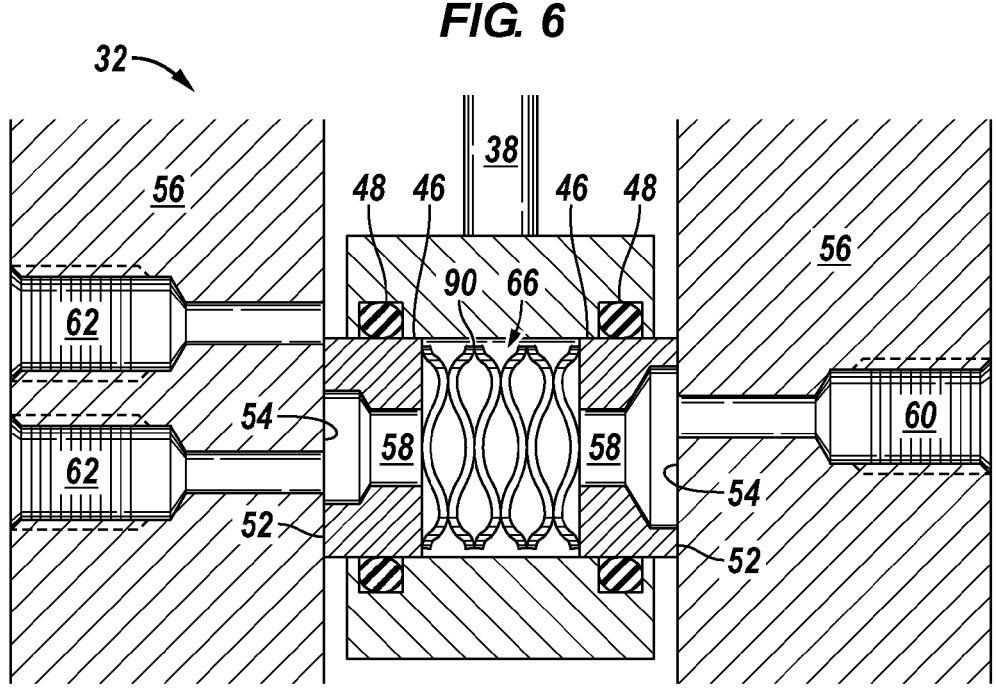
FIG. 6 is a cross-sectional illustration of another example of a portion of a shear seal type valve, according to an embodiment of the disclosure.
Figure 7:
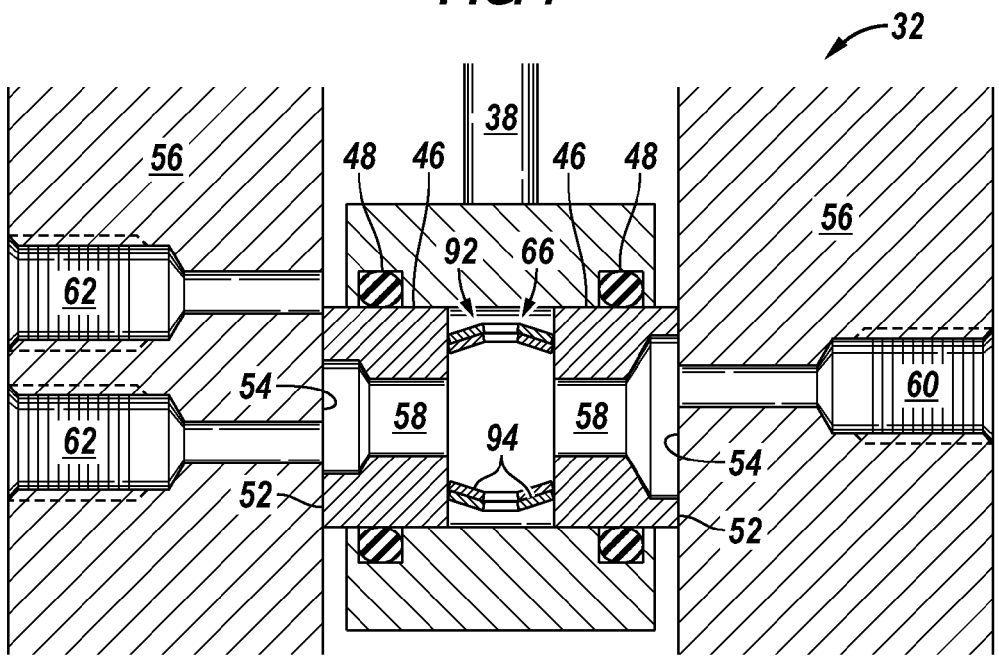
FIG. 7 is a cross-sectional illustration of another example of a portion of a shear seal type valve, according to an embodiment of the disclosure.
Figure 8:
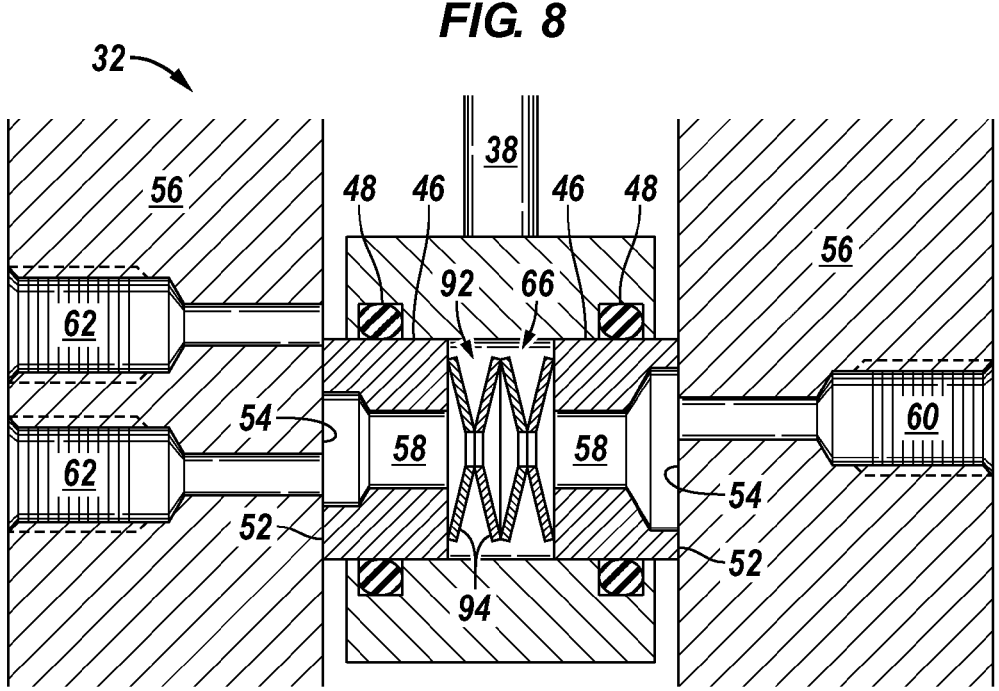
FIG. 8 is a cross-sectional illustration of another example of a portion of a shear seal type valve, according to an embodiment of the disclosure.

Referring generally to FIG. 6, another embodiment of biasing mechanism 66 is illustrated. In this example, the biasing mechanism 66 comprises a wave energizer 90, e.g. a metallic wave energizer, capable of exerting an outwardly directed force on the seal cylinders 46 to force the shear seal contacts 52 against the corresponding seal surfaces 54 of seal plates 56. The wave energizer 90 may be formed from a series of cooperating, wavy elements formed from metal or other suitable materials which are sufficiently resilient to apply the desired force against seal cylinders 46.

Figure 9:
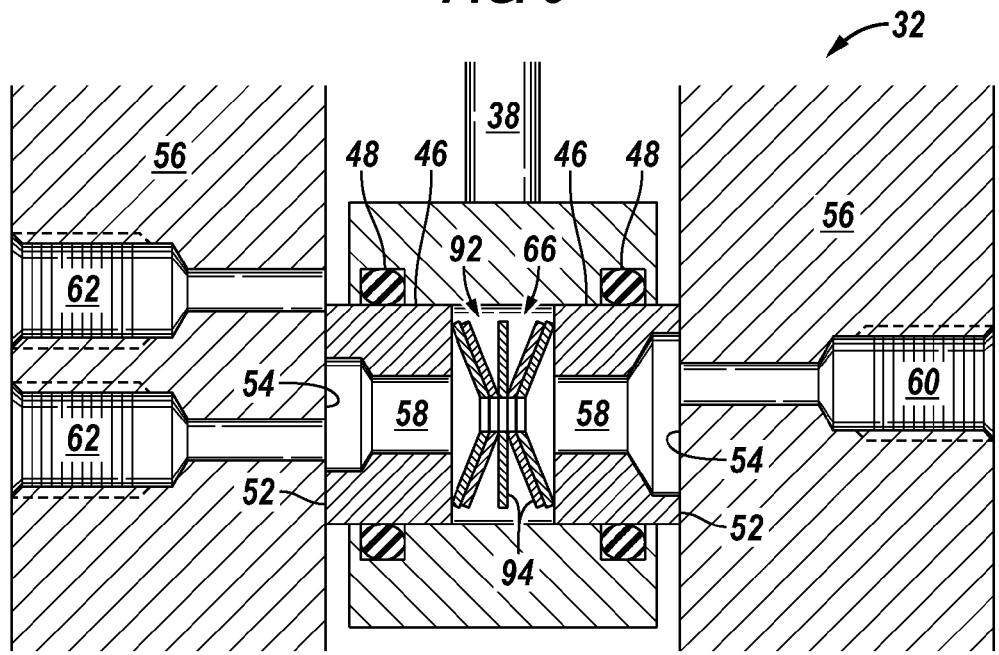
FIG. 9 is a cross-sectional illustration of another example of a portion of a shear seal type valve, according to an embodiment of the disclosure.
Figure 10:
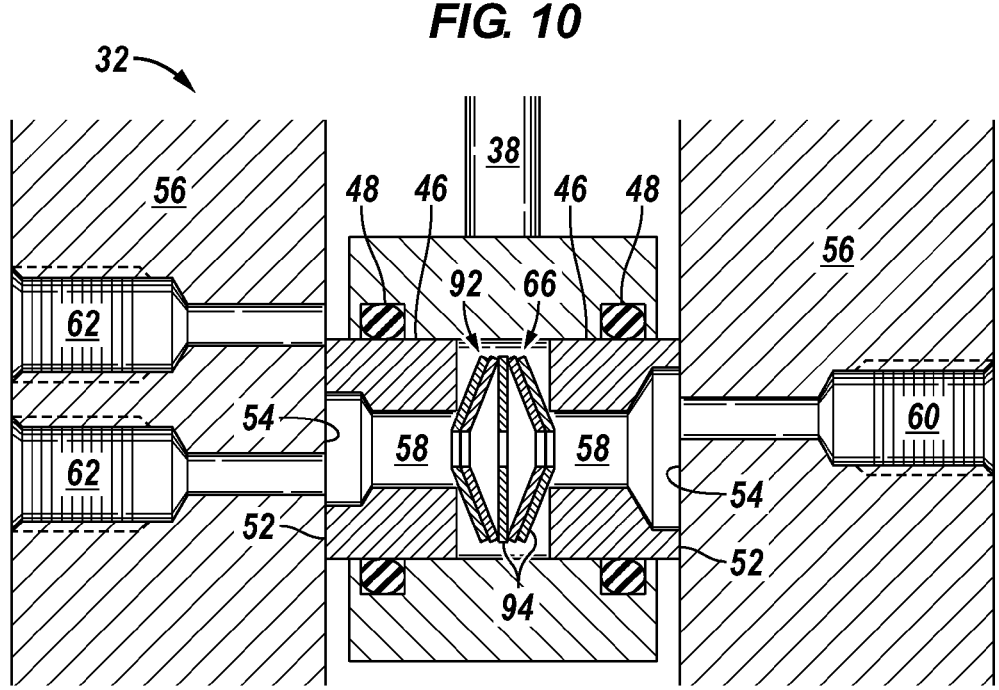
FIG. 10 is a cross-sectional illustration of another example of a portion of a shear seal type valve, according to an embodiment of the disclosure.
Figure 11:
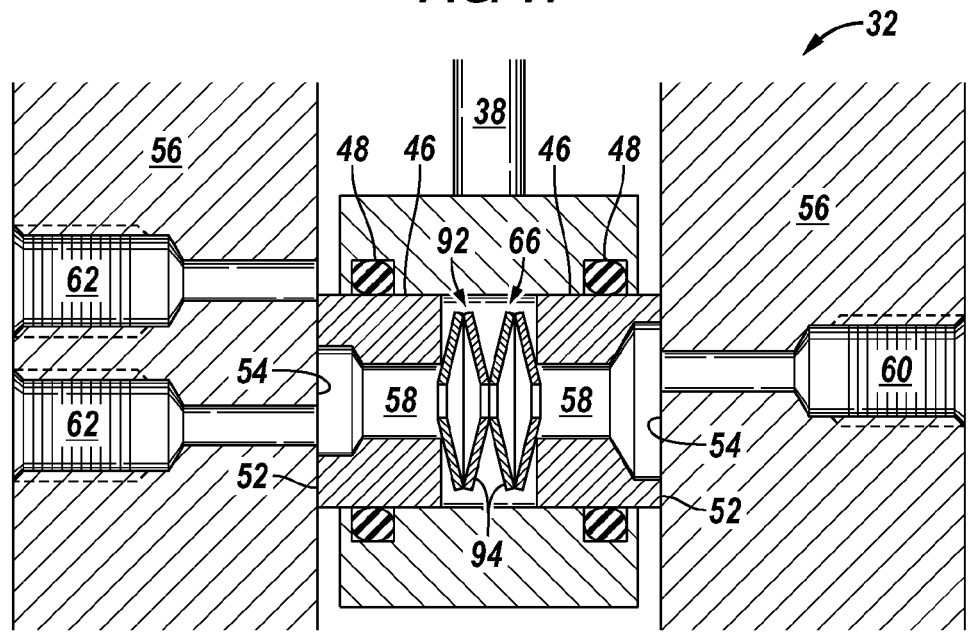
FIG. 11 is a cross-sectional illustration of another example of a portion of a shear seal type valve, according to an embodiment of the disclosure.

Referring generally to FIGS. 7-11, another embodiment of biasing mechanism 66 is illustrated in the form of a metal energizing section 92 able to exert the desired, outwardly directed force. In the embodiment illustrated in FIG. 7, the metal energizing section 92 is formed with a single spring member 94 or a plurality of stacked members 94 which are stacked in a radial direction with respect to the transverse passage carrying seal cylinders 46. By way of example, the single member 94 or plurality of stacked members 94 may comprise leaf springs, Belleville washers, disk springs, or other suitable types of spring members. In the embodiment illustrated in FIG. 8, a similar single spring member 94 or plurality of stacked members 94 may be stacked in an axial direction. In some applications, a greater number of spring members 94 may be stacked to form the metal energizing section 92 by nesting similar single members, as illustrated in FIG. 9. Additionally, the orientation of the spring members 94 may vary between different applications; and the spring members 94 may be stacked in a variety of cooperating patterns, as illustrated in the examples of FIG. 10 and FIG. 11.

Figure 12:
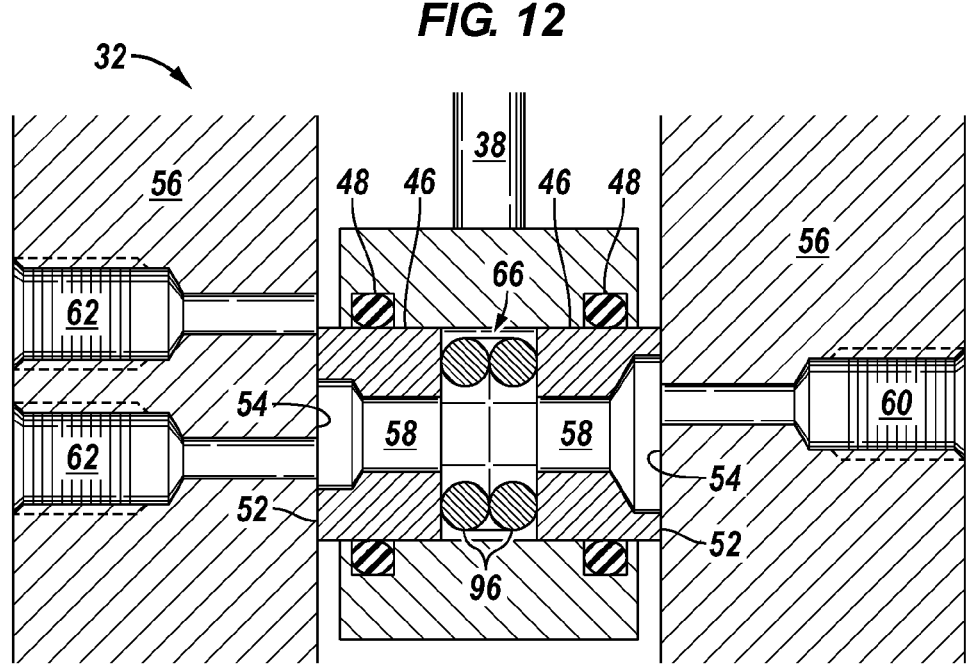
FIG. 12 is a cross-sectional illustration of another example of a portion of a shear seal type valve, according to an embodiment of the disclosure.

Referring generally to FIG. 12, another example of biasing mechanism 66 is illustrated. In this example, biasing mechanism 66 comprises a shape changing structure 96. By way of example, shape changing structure 96 may comprise a shape memory alloy or a smart metal shape geometry material capable of changing shape or geometry with an appropriate trigger mechanism. The trigger mechanism may be temperature, magnetic field, chemicals, current, or other suitable triggers used to initiate shape changes and thus exertion of an outward force against seal cylinders 46. Depending on the configuration, the outward force may be axially or radially directed with respect to the seal cylinders 46. The force is sufficient to cause a desired sealing at a shear seal interface between shear seal contact surfaces 52 and the corresponding seal surface 54.

Figure 13:
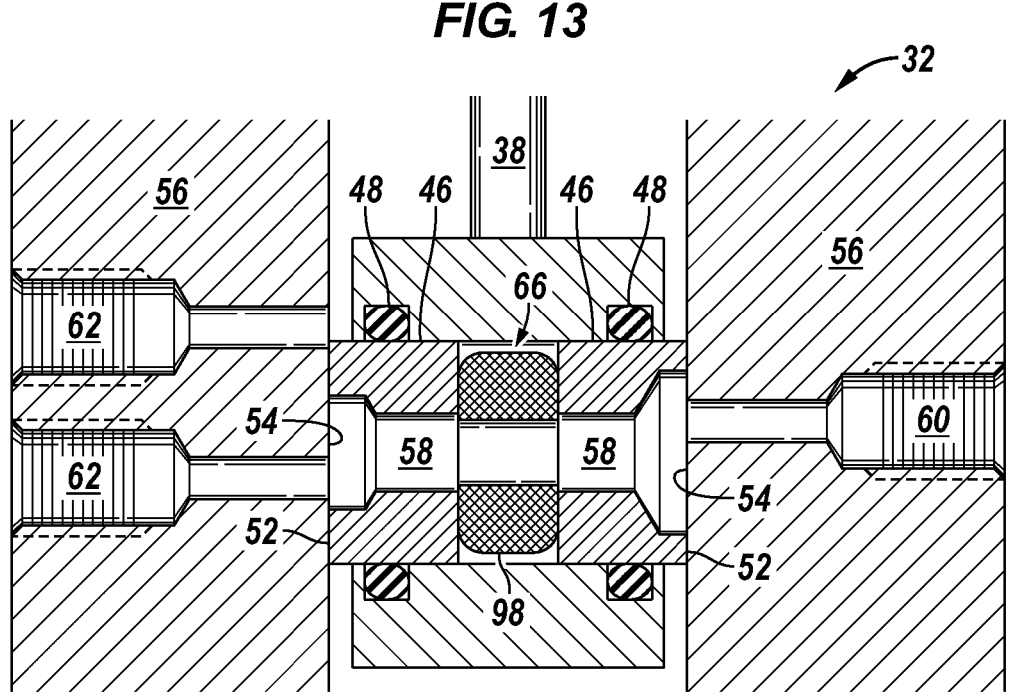
FIG. 13 is a cross-sectional illustration of another example of a portion of a shear seal type valve, according to an embodiment of the disclosure.

In another example, the biasing mechanism 66 comprises a swellable material 98, as illustrated in the embodiment of FIG. 13. By way of example, the swellable material 98 may comprise an oil or water swellable material with suitable swellable shaped geometries. This type of substance is able to exhibit shape change in the presence of either oil-based hydraulic fluid or water-based hydraulic fluid or both. The change in shape/geometry is used to exert the desired outward force against seal cylinders 46. The outwardly directed force is similarly sufficient to cause the desired sealing at the shear seal interface between shear seal contact surfaces 52 and the corresponding seal surface 54.

The various embodiments of biasing mechanism 66 provides simple assemblies which are each capable of achieving relatively high force within a small geometry or space. Many of these embodiments also reduce tolerance stack up for the spacing between the seal faces along the shear seal interface. Depending on the application, a wide variety of materials may be used. By way of example, the illustrated metallic bellows may be made from different types of materials, including specialized materials that can be formed, welded, electro-deposited, chemical deposited, or otherwise formed. The seal cylinders and inserts 86 may have mating surfaces made from spring materials or other suitable materials having hard coatings or other types of surface treatments. In some applications, the seal cylinders and inserts may have mating surfaces made from ceramics, self-lubricated ceramics, or other specialized ceramics. The spring members 94 may be made from various spring materials, and hard coatings or other surface treatments may be applied to optimize performance. Furthermore, the illustrated shear seal valves represent examples of implementations, e.g. a two-position, four-way valve, however many other valve functionalities are possible with greater or lesser numbers of ports and carrier positions. The shear seal mechanism and energization method described herein may be applied to many types of shear seal valves.

Figure 14:
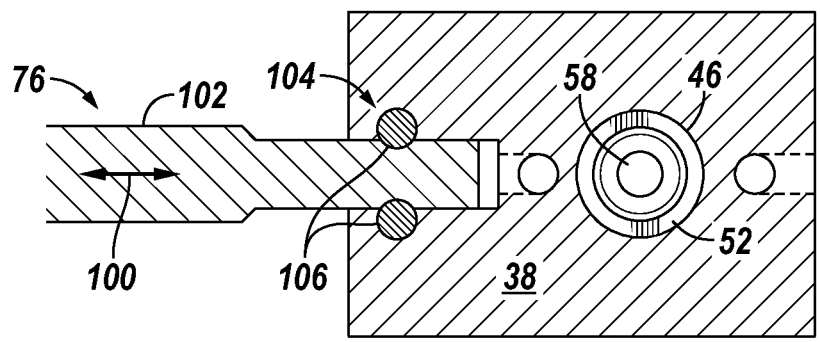
FIG. 14 is a cross-sectional illustration of an example of a driving mechanism of a shear seal type valve, according to an embodiment of the disclosure.
Figure 15:
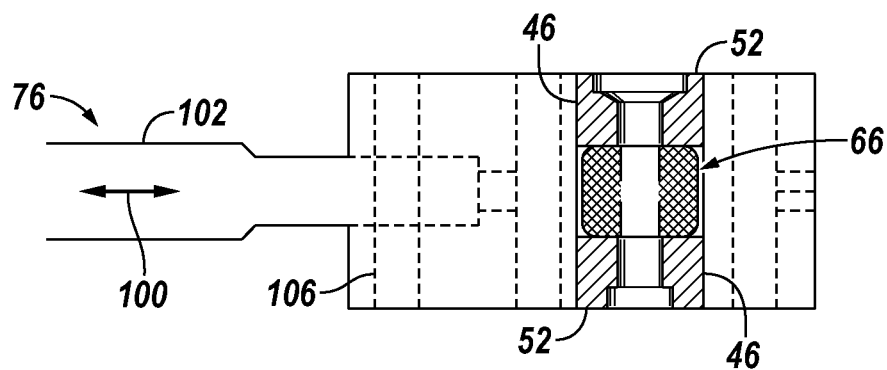
FIG. 15 is a schematic illustration of an example of a driving mechanism of a shear seal type valve, according to an embodiment of the disclosure.
Figure 16:
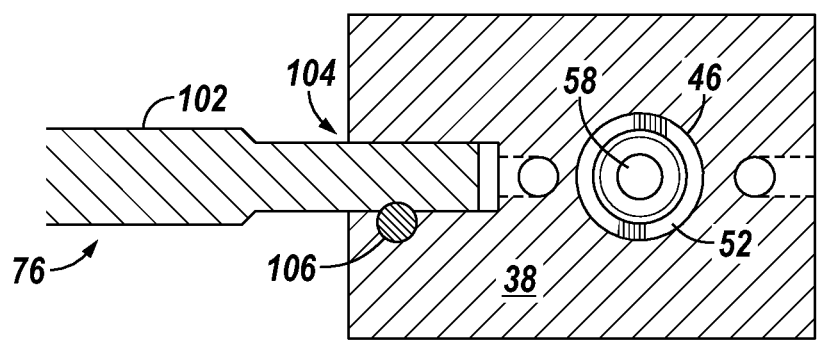
FIG. 16 is a cross-sectional illustration of another example of a driving mechanism of a shear seal type valve, according to an embodiment of the disclosure.

In some applications, valve 32 may utilize components which are decoupled from each other in manners which provide greater degrees of freedom. For example, the driving mechanism 76 may be decoupled from the carrier 38 with respect to all degrees of freedom, except in the direction of carrier movement. In an embodiment illustrated in FIGS. 14 and 15, for example, the driving mechanism 76 is coupled to carrier 38 to enable movement of the carrier 38 in a direction along the axis of driving mechanism 76, as represented by arrow 100 while leaving flexibility with respect to other degrees of freedom. In the embodiment illustrated in FIGS. 14 and 15, drive mechanism 76 may be in the form of a drive shaft 102 integrally coupled with carrier 38 containing seal cylinders 46. The drive shaft 102 is able to transmit movement in the direction of carrier travel, as described above, but leaves flexibility with respect to other degrees of freedom at a flex joint 104. In this example, the drive shaft 102 is constrained in carrier 38 by a plurality of pins 106 (see FIG. 14) which compensate for minor misalignment between the seal carrier 38 and the driving mechanism 76 while still providing for bi-directional movement in the sealing direction. In this example, the seal carrier 38 also can be designed to freely rotate about its symmetry axis along driving mechanism 76 without compromising the sealing performance of seal cylinders 46. The pins 106 may be made from various materials, including specialized spring materials, shape memory alloy materials, smart metal shape geometry materials, or other suitable materials. In some applications, a single pin 106 may be utilized, as illustrated by the embodiment of FIG. 16.

Figure 17:
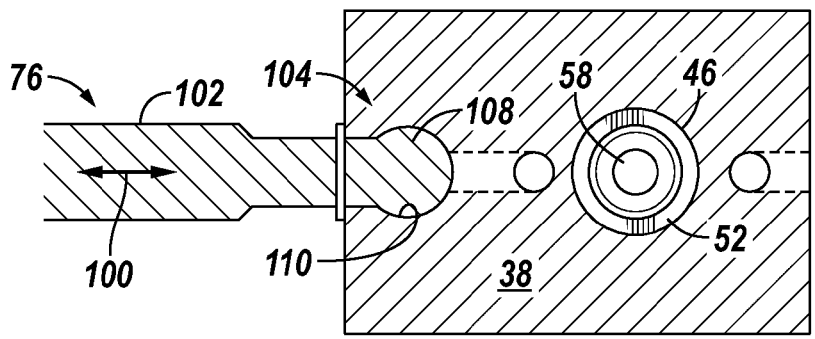
FIG. 17 is a cross-sectional illustration of another example of a driving mechanism of a shear seal type valve, according to an embodiment of the disclosure.
Figure 18:
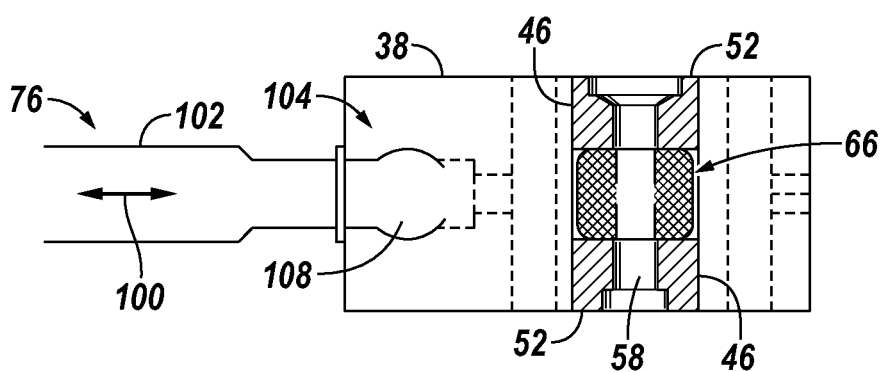
FIG. 18 is a schematic illustration of another example of a driving mechanism of a shear seal type valve, according to an embodiment of the disclosure.

Referring generally to FIGS. 17 and 18, another embodiment of a coupling between the driving mechanism 76 and the carrier 38 is illustrated. In this embodiment, the flex joint 104 is formed as a ball joint having a ball 108 received in a ball receptacle 110 formed in carrier 38. Constraining the driving mechanism 76 with ball joint 104 compensates for some misalignment between the seal carrier 38 and the driving mechanism 76 while providing good bi-directional movement in the axial direction of the driving mechanism 76. In this example, the seal carrier 38 also can be rotated or tilted without compromising the sealing performance of seal cylinders 46. It should be noted that such flexibility at the driving mechanism-to-seal carrier interface also can facilitate assembly of the valve 32 because the ball joint 104 is able to isolate inadvertent load/torque transfers so that such loading is not transmitted to the seal carrier 38.

Figure 19:
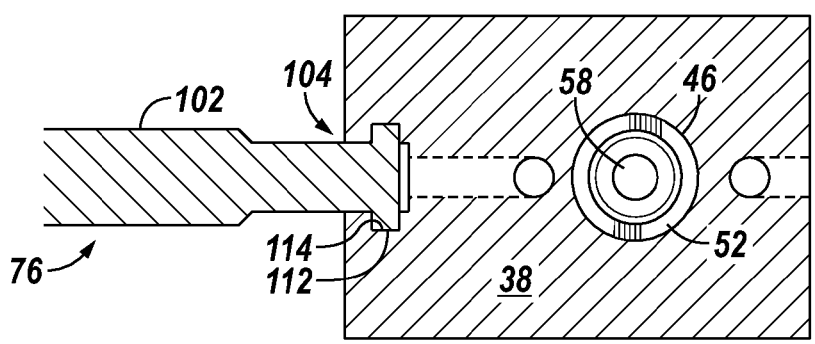
FIG. 19 is a cross-sectional illustration of another example of a driving mechanism of a shear seal type valve, according to an embodiment of the disclosure.

In some applications, the joint 104 may be formed with a circular head 112 integrated with the seal carrier 38 containing seal cylinders 46, as illustrated in FIG. 19. In this example, circular head 112 is trapped within a corresponding receptacle 114 formed in carrier 38 so as to decouple axial torques between driving mechanism 76 and carrier 38 while enabling the desired axial movement.

Referring generally to FIG. 20, another embodiment of a coupling between the driving mechanism 76 and the seal carrier 38 is illustrated. In this example, the joint 104 comprises a captive elastic ring 116 which holds the driving mechanism 76, e.g. drive shaft 102, inside the seal carrier 38. The captive elastic ring 116 works in a fashion similar to circular head 112 in that it allows for additional elasticity at joint 104, thus compensating for small angular misalignments of the driving mechanism 76 with respect to the seal carrier 38. The captive elastic ring may be made from a variety of elastic materials, including specialized spring materials, shape memory alloy materials, smart metal shape geometry materials, or other suitable materials. In some applications, the captive elastic ring 116 may be mounted on the seal carrier 38 in a manner which holds the driving mechanism 76 in place.

The driving mechanism 76 may be constructed in many forms and, in some applications, mechanism 76 may be decoupled at other locations, as in the embodiment illustrated in FIG. 21. In this example, the driving mechanism 76 is a drive shaft 102 integral with the seal carrier 38 to form an integral, one-piece construction. However, a drive shaft end 118 located at an opposite end of the driveshaft 102 relative to carrier 38 is designed to provide the additional degrees of freedom. The opposite drive shaft end 118 may be decoupled by using a variety of techniques, such as those discussed above for forming flex joint 104, but at a distance away from the seal carrier 38 and seal cylinders 46. The distal flex joint still provides the desired additional degrees of freedom. It should be noted that the embodiments described in FIGS. 14-21 represent an example of a shear seal valve implementation, e.g. a two-position, four-way valve. However, many other valve functionalities are possible with greater or lesser numbers of ports and carrier positions.

Figure 22:
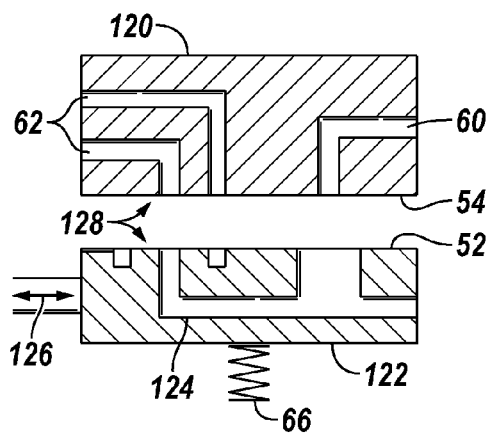
FIG. 22 is a cross-sectional illustration of an example of a port arrangement of a shear seal type valve, according to an embodiment of the disclosure.
Figure 23:
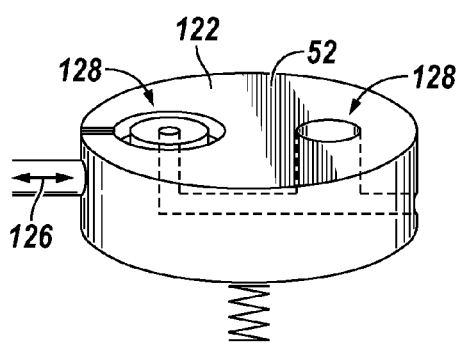
FIG. 23 is a schematic illustration of a portion of the port arrangement illustrated in FIG. 22, according to an embodiment of the disclosure.

Depending on the parameters of a given application, various embodiments of valve 32 may be employed to facilitate shifting of the shear seal valve or valves 32 under small geometrical/space constructions, such as those found in downhole tools. Referring generally to FIGS. 22 and 23, an embodiment is illustrated of a port architecture utilizing a co-planar, non-axial configuration. In this embodiment, the shear seal is formed by a stationary part 120 and a dynamic part 122. The supply port 60 and a plurality of regulated ports 62 are located on the stationary part 120 while corresponding communication channels 124 are located on the dynamic part 122.

In this embodiment, the dynamic part 122 shuttles linearly, as indicated by arrow 126, to communicate fluid from the supply port 60 into the respective related ports 62 of the stationary part 120. Fluid communication is through internal geometrical features 128, and the geometrical features are located on the shear sealing surface interface, e.g. shear seal contact surface 52 and seal surface 54 interface, between the stationary part 120 and the dynamic part 122. In this example, the dynamic part 122 is held against the stationary part 120 with sufficient force by biasing mechanism 66 which is capable of exerting external force. Biasing mechanism 66 may comprise a spring, bellows, swellable elements, shape memory alloy, or other suitable biasing members. The stationary part 120 and the dynamic part 122 may be made from various materials, such as metals, alloys, ceramics, ceramics with special lubricants or coatings capable of withstanding downhole conditions, or other suitable materials.

Figure 24:
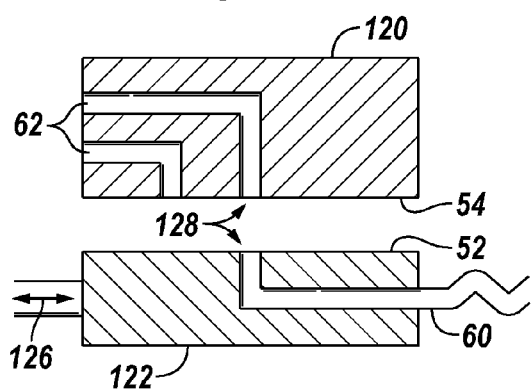
FIG. 24 is a schematic illustration of another example of a port arrangement of a shear seal type valve, according to an embodiment of the disclosure.

In another embodiment, the port architecture utilizes another co-planar, non-axial configuration in which the shear seal is formed by stationary part 120 and dynamic part 122, as illustrated in FIG. 24. In this example, the supply port 60 is located on the dynamic part 122 and the regulated ports 62 are located on the stationary part 120. The dynamic part 122 shuttles linearly to communicate fluid from the supply port 60 into the respective regulated ports 62 of the stationary part 120. The dynamic port 122 is equipped with a suitable device able to supply fluid while allowing the dynamic part 122 to shuttle linearly. Such a suitable device may comprise a flexible control line, flexible bellows, flexible tubing, coil cords, e.g. coil cords made from metallic materials, alloys, or elastomeric/plastic materials, or other suitable materials.

Fluid communication is through internal geometrical features 128 which are located on the shear sealing surface interface, e.g. shear seal contact surface 52 and seal surface 54 interface, between the stationary part 120 and the dynamic part 122. In this example, the dynamic part 122 is held against the stationary part 120 with sufficient force by biasing mechanism 66 which is capable of exerting external force. Biasing mechanism 66 may comprise a spring, bellows, swellable elements, shape memory alloy, or other suitable biasing members. The stationary part 120 and the dynamic part 122 may be made from various materials, such as metals, alloys, ceramics, ceramics with special lubricants or coatings capable of withstanding downhole conditions, or other suitable materials.

Figure 25:
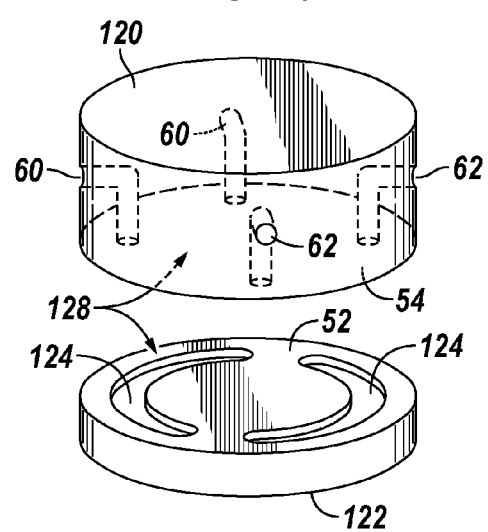
FIG. 25 is a schematic illustration of another example of a port arrangement of a shear seal type valve, according to an embodiment of the disclosure.

In another embodiment, the port architecture utilizes non-planar, non-axial configuration in which the shear seal is formed by stationary part 120 and dynamic part 122, as illustrated in FIG. 25. In this example, the dynamic part 122 is a rotating or pivoting part. The supply and regulated ports 60, 62 are located on the stationary part 120 while the communication channels 124 are located on the dynamic part 122. The dynamic part 122 rotates to communicate fluid from the supply port 60 into the respective regulated ports 62 of the stationary part 120.

Fluid communication is through internal geometrical features 128 which are located on the shear sealing surface interface, e.g. shear seal contact surface 52 and seal surface 54 interface, between the stationary part 120 and the dynamic part 122. In this example, the dynamic part 122 is held against the stationary part 120 with sufficient force by biasing mechanism 66 which is capable of exerting external force. Biasing mechanism 66 may comprise a spring, bellows, swellable elements, shape memory alloy, or other suitable biasing members. The stationary part 120 and the dynamic part 122 may be made from various materials, such as metals, alloys, ceramics, ceramics with special lubricants or coatings capable of withstanding downhole conditions, or other suitable materials. The dynamic part 122 may be activated, e.g. rotated, by an activating member undergoing linear displacement, rotational torque, linear displacement with an offset for force multiplication, or other suitable activating motion.

Figure 26:
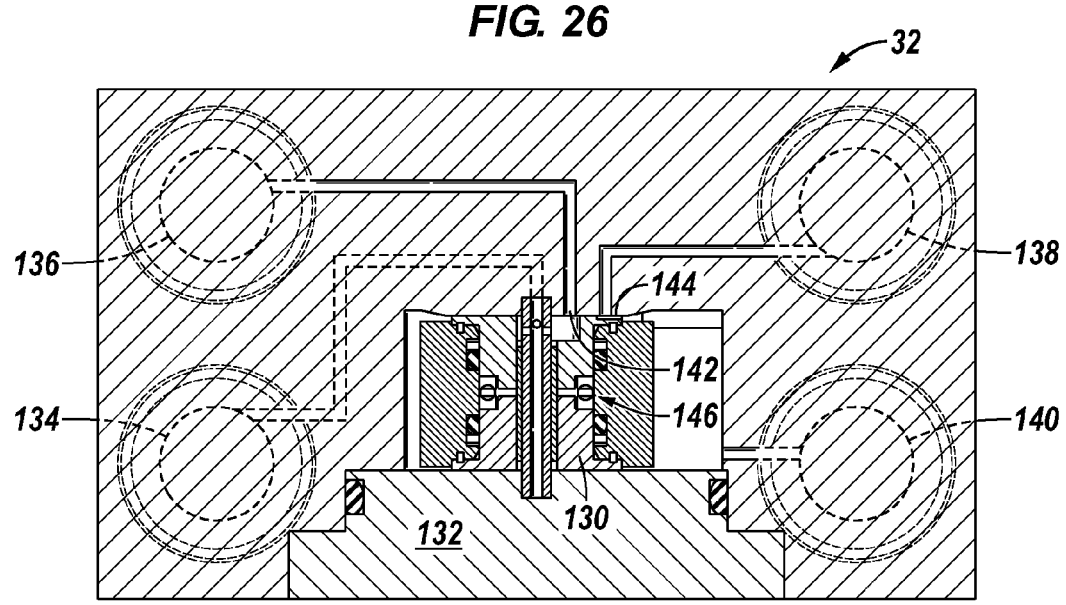
FIG. 26 is a schematic illustration of another example of a shear seal type valve, according to an embodiment of the disclosure.
Figure 27:
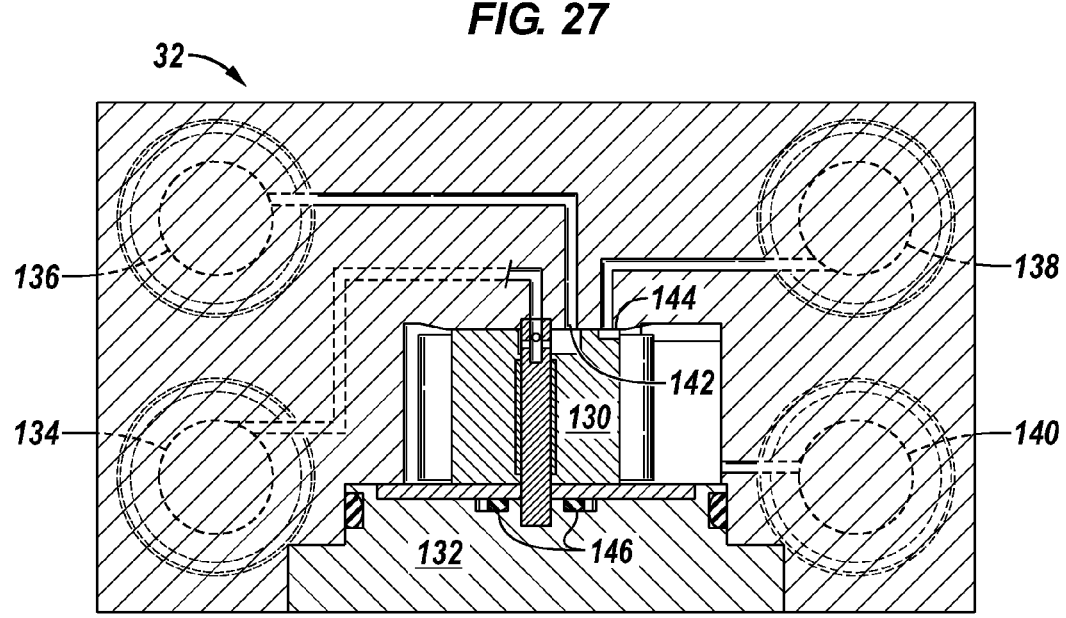
FIG. 27 is a schematic illustration of another example of a shear seal type valve, according to an embodiment of the disclosure.
Figure 28:
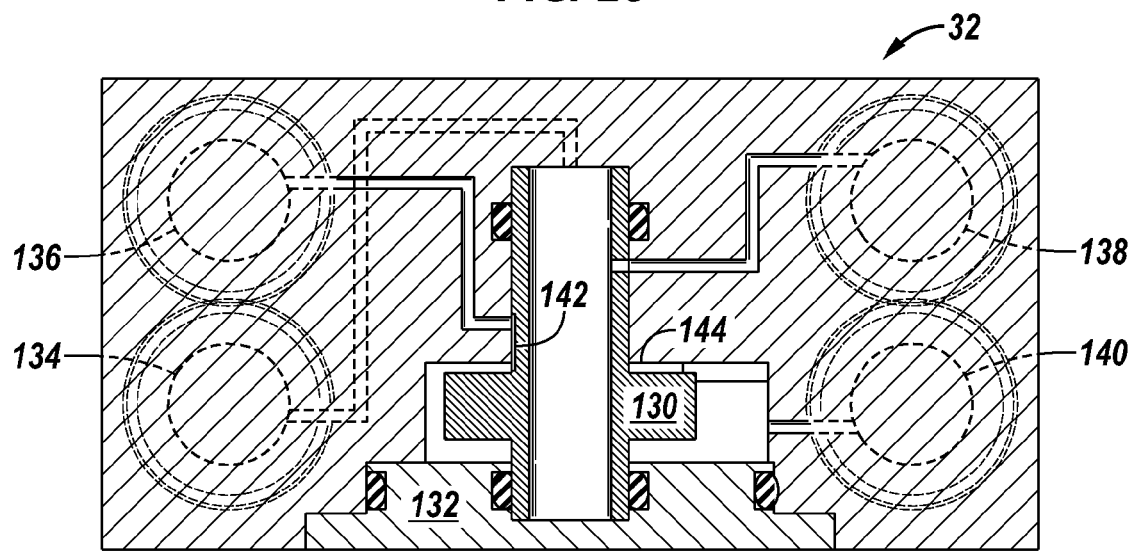
FIG. 28 is a schematic illustration of another example of a shear seal type valve, according to an embodiment of the disclosure.

Referring generally to FIGS. 26-28, various embodiments of valve 32, stationary part 120, and dynamic part 122 are illustrated. However, other types of components arranged in various configurations may be used to achieve the desired functionality. Similarly, various numbers and arrangements of supply ports 60 and regulated ports 62 may be utilized in the example configurations illustrated in FIGS. 29-31. In the embodiments illustrated in FIGS. 26-31, the shear valve 32 is a rotary type valve.

Referring initially to the embodiment of FIG. 26, valve 32 is illustrated as a rotary shearing seal valve which can be operated with step rotary motion or via a linear motion which is converted into rotation by a conversion system. In this example, the carrier 38 is in the form of a rotor 130 which rotates against a stator 132 having various patterns of flow channels. The opening and closing of valve ports are decided by geometric matches between the stator 132 and the rotor 130. In the stator 132, various flow channels are connected to ports 134, 136 and 138. The system also may comprise a vent port 140. In the rotor 130, a pressure groove 142 connects a corresponding pressure channel to either port 136 or port 138 depending on the position of rotor 130. Similarly, a vent groove 144 connects either port 138 or port 136.

In this example, a shearing seal is pre-energized with an energizing member 146 located in a generally middle position of the rotor. In the embodiment of FIG. 27, however, the shearing seal is pre-energized with energizing member 146 located generally at a bottom position of the rotor 130. FIG. 28 illustrates another embodiment of the rotary type valve 32 which is constructed with a shearing seal between cylindrical surfaces and the pressure groove 142/vent groove 144 may be located accordingly. In the various rotary type valve embodiments, the energizing member 146 for pre-energizing the shearing seal can be formed in various configurations and various materials, including metal and/or non-metal materials. Examples of energizing members 146 include O-rings, wavy round wire springs, wavy flat wire springs, leaf type springs, bellows type springs, disk type springs, metal mechanical spring energized seals, contained swellable materials, and/or other suitable energizing members.

Figure 29:
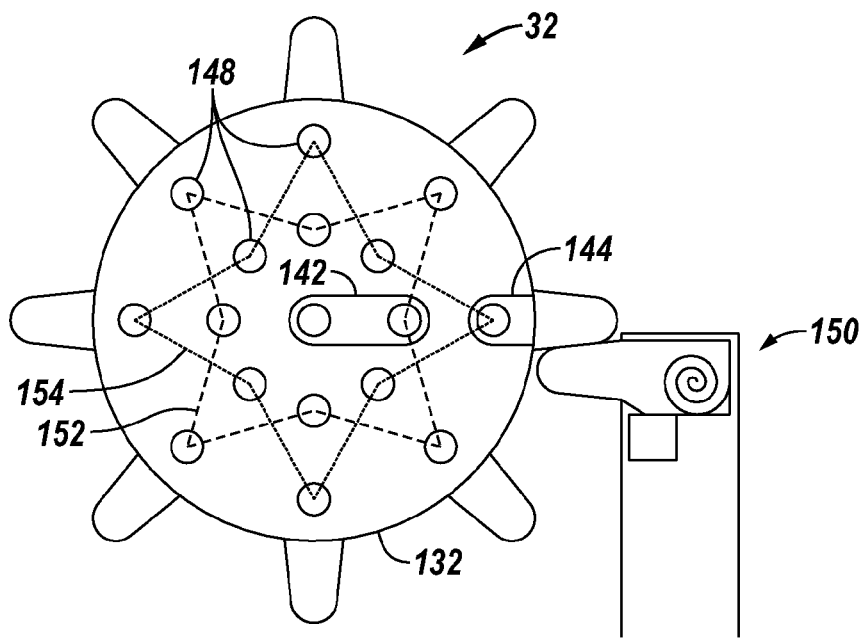
FIG. 29 is a schematic illustration of another example of an arrangement of ports for a shear seal type valve, according to an embodiment of the disclosure.
Figure 30:
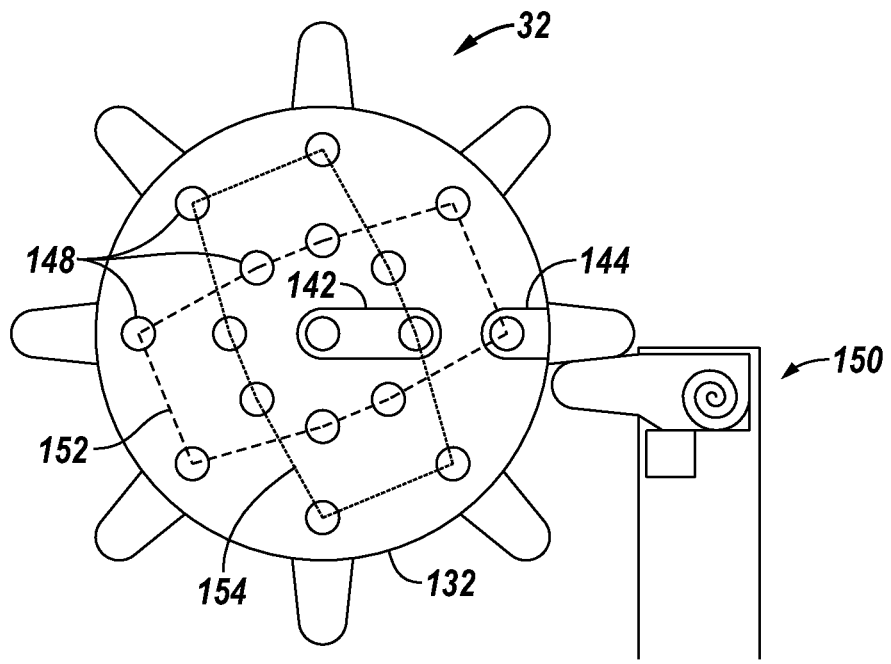
FIG. 30 is a schematic illustration of another example of an arrangement of ports for a shear seal type valve, according to an embodiment of the disclosure.
Figure 31:
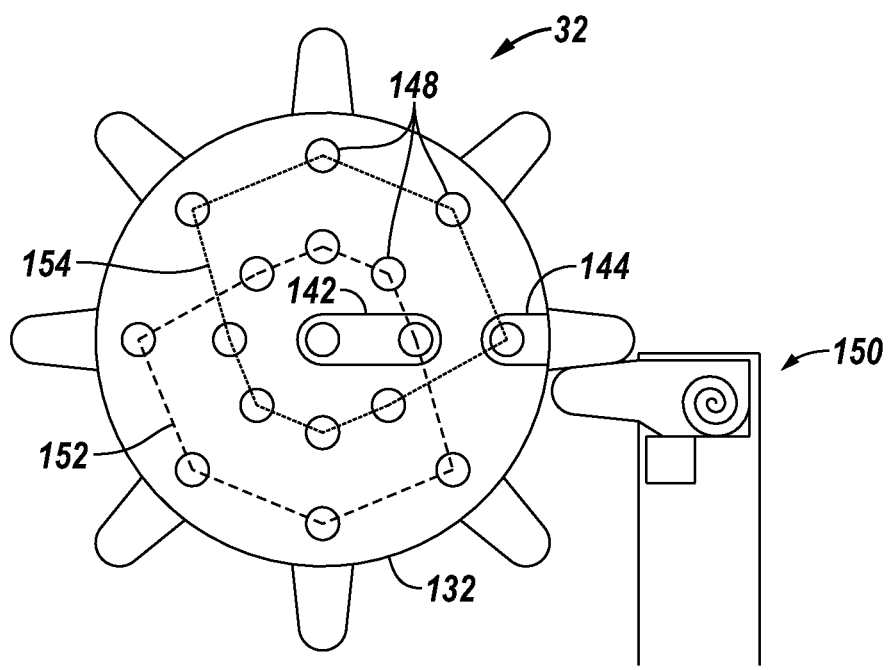
FIG. 31 is a schematic illustration of another example of an arrangement of ports for a shear seal type valve, according to an embodiment of the disclosure.

Referring to FIGS. 29-31, patterns of flow channels 148 are illustrated for selective communication with the various ports. The patterns of flow channels are located on stator 132, and the valve 32 may be operated via a variety of indexers 150 to selectively establish communication between the desired flow channels 148 and pressure groove 142 or vent groove 144. For example, FIG. 29 illustrates a flow channel pattern for a valve stator 132 used in a 2-pulse mini-indexer. In the configuration illustrated, the flow channels 148 intersected by line 152 connect port 136 with port 134 through pressure groove 142. Additionally, the flow channels 148 intersected by line 154 connect port 138 with vent port 140 via vent groove 144. In this example, when the rotor 130 is actuated to turn a predetermined amount, e.g. 45°, port 134 is connected to port 138 and port 136 is connected to vent port 140. However, various arrangements of ports and flow channels may be employed. In FIG. 30, for example, an embodiment is provided which illustrates flow channels 148 inside the valve stator 132 of a 4-pulse mini-indexer. Additionally, the embodiment of FIG. 31 illustrates flow channels 148 inside the valve stator 132 of an 8-pulse mini-indexer.

The embodiments described herein provide simple assemblies which are each capable of achieving relatively high force within a small geometry or space. Many of these embodiments also reduce variability and tolerance stack up between the sealing surfaces along the shear seal interface. The embodiments also provide the ability to achieve force multiplication and a lower number of sealing surfaces. In some applications, the embodiments also enable use of larger sized components and components less prone to leakage. The architecture enables a reduced part count and construction of assemblies which are insensitive or less sensitive to manufacturing or assembly variations.

Various components and arrangements of components may be utilized to achieve the desired operation and functionality of the shear seal valve. Additionally, several types of materials may be used in constructing the valve components. For example, the seal cylinders and inserts may have mating surfaces made from spring materials or other suitable materials having hard coatings or other types of surface treatments able to facilitate a desired performance. In some applications, the seal cylinders and inserts may have mating surfaces made from ceramics, self-lubricated ceramics, or other specialized ceramics. Furthermore, the illustrated shear seal valve represent examples of implementations, e.g.

a two-position, four-way valve, however many other valve functionalities are possible with greater or lesser numbers of ports and carrier positions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a wellbore, comprising:
   a downhole tool; and
   a valve cooperating with the downhole tool, the valve comprising:
      a shear seal interface formed between a stationary component having a seal surface and a dynamic component having a shear seal contact surface slidably engaged with the seal surface;
      a plurality of ports positioned such that movement of the shear seal contact surface with respect to the seal surface controls flow between selected ports of the plurality of ports;
      a driving mechanism coupled to the dynamic component to selectively slide the shear seal contact surface with respect to the seal surface; and
      a bellows positioned to engage the dynamic component and to bias the shear seal contact surface against the seal surface.

2. The system as recited in claim 1, wherein the dynamic component comprises a pair of seal cylinders comprising the shear seal contact surface; and the bellows is integrated with the pair of seal cylinders.

3. The system as recited in claim 1, wherein the dynamic component comprises a carrier and the driving mechanism is coupled to the carrier via a flex joint.

4. The system as recited in claim 3, wherein the flex joint comprises at least one pin positioned to flexibly capture an end of the driving mechanism in the carrier.

5. The system as recited in claim 3, wherein the flex joint comprises a ball joint.

6. The system as recited in claim 3, wherein the flex joint comprises a circular head captured in a corresponding receptacle formed in the carrier.

7. The system as recited in claim 3, wherein the flex joint comprises an elastic ring positioned to flexibly capture an end of the driving mechanism in the carrier.

8. The system as recited in claim 1, wherein the dynamic component comprises a carrier and the driving mechanism is coupled to the carrier, the driving mechanism having a flex joint spaced from the carrier.

9. The system as recited in claim 1, wherein the dynamic component slides linearly with respect to the stationary component; and the plurality of ports comprises supply and regulated ports located on the stationary component.

10. The system as recited in claim 1, wherein the dynamic component slides linearly with respect to the stationary component; and the plurality of ports comprises supply and regulated ports in which a supply port is located on the dynamic component.

11. The system as recited in claim 1, wherein the dynamic component rotates with respect to the stationary component.

12. A method for controlling fluid flow, comprising:
   providing a plurality of ports in a shear seal valve;
   controlling flow of fluid between selected ports of the plurality of ports by changing fluid flow paths via movement of a shear seal contact surface relative to a corresponding seal surface;
   locating the shear seal contact surface on a dynamic component and the corresponding seal surface on a stationary component, wherein the shear seal contact surface is slidably engaged with the corresponding seal surface; and
   biasing the shear seal contact surface against the corresponding seal surface via a bellows to create the shear seal valve.

13. The method as recited in claim 12, further comprising coupling a driving mechanism to the dynamic component with a flex joint.

* * * * *